US008630976B2

(12) United States Patent
Müller et al.

(10) Patent No.: US 8,630,976 B2
(45) Date of Patent: Jan. 14, 2014

(54) FAST SEARCH REPLICATION SYNCHRONIZATION PROCESSES

(75) Inventors: Martin Müller, Walldorf (DE); Maic Wintel, Walldorf (DE)

(73) Assignee: SAP AG, Walldorf (DE)

( * ) Notice: Subject to any disclaimer, the term of this patent is extended or adjusted under 35 U.S.C. 154(b) by 1172 days.

(21) Appl. No.: 12/195,111

(22) Filed: Aug. 20, 2008

(65) Prior Publication Data

US 2010/0049714 A1 Feb. 25, 2010

(51) Int. Cl.
*G06F 7/00* (2006.01)

(52) U.S. Cl.
USPC .......................................... 707/609; 707/638

(58) Field of Classification Search
USPC .......... 707/609–611, 634, 637–638; 710/200; 370/390
See application file for complete search history.

(56) References Cited

U.S. PATENT DOCUMENTS

| | | | | |
|---|---|---|---|---|
| 7,788,314 | B2* | 8/2010 | Holt | 709/201 |
| 2001/0032281 | A1* | 10/2001 | Daynes | 710/200 |
| 2002/0133507 | A1* | 9/2002 | Holenstein et al. | 707/200 |
| 2004/0133591 | A1* | 7/2004 | Holenstein et al. | 707/102 |
| 2004/0148447 | A1 | 7/2004 | Conrad et al. | |
| 2004/0255048 | A1* | 12/2004 | Lev Ran et al. | 709/249 |
| 2005/0071470 | A1* | 3/2005 | O'Brien et al. | 709/226 |
| 2005/0192989 | A1* | 9/2005 | Adiba et al. | 707/101 |
| 2005/0193039 | A1 | 9/2005 | Adiba et al. | |
| 2006/0155729 | A1* | 7/2006 | Aahlad et al. | 707/100 |
| 2006/0212496 | A1 | 9/2006 | Romine et al. | |
| 2006/0235889 | A1* | 10/2006 | Rousseau et al. | 707/104.1 |
| 2008/0109496 | A1 | 5/2008 | Holenstein et al. | |

OTHER PUBLICATIONS

"European Search Report", dated Nov. 6, 2009, for European Application No. 09009931.8-1229, 3pgs.
European Patent Office, "Communication pursuant to Article 94(3) EPC", dated Jul. 25, 2013, for European Application No. 09009931. 8-1953, 6pgs.

* cited by examiner

*Primary Examiner* — James Trujillo
*Assistant Examiner* — Linh Black
(74) *Attorney, Agent, or Firm* — Buckley, Maschoff & Talwalkar LLC

(57) ABSTRACT

A method and medium for performing a replication process are provided. The method includes receiving a request to perform an initial load of a first persistence of at least one business object node to replicate the at least one business object node to a second persistence of the business object node; providing a queue to store updates of the at least one business object node; setting a lock for the at least one business object node, the lock indicating a replicating process is performing the initial load of the at least one business object node; determining whether the lock is set for the at least one business object node; and storing, in the queue, the updates of the at least one business object node that occur in parallel with the replicating process in an instance it is determined the lock is set for the at least one business object node.

18 Claims, 7 Drawing Sheets

200

```
RECEIVE A REQUEST TO PERFORM AN INITIAL
LOAD OF A FIRST PERSISTENCE OF AT LEAST ONE
BUSINESS OBJECT TO REPLICATE THE AT LEAST
ONE BUSINESS OBJECT TO A SECOND PERSISTENCE
OF THE AT LEAST ONE BUSINESS OBJECT
                                         205
```
↓
```
PROVIDE A QUEUE TO STORE UPDATES OF AT
LEAST ONE BUSINESS OBJECT NODE ASSOCIATED
WITH THE BUSINESS OBJECT BEING REPLICATED
                                         210
```
↓
```
SET A LOCK FOR THE AT LEAST ONE BUSINESS
OBJECT NODE, THE LOCK INDICATING A REPLICATING
PROCESS IS PERFORMING THE INITIAL LOAD
OF THE AT LEAST ONE BUSINESS OBJECT NODE
                                         215
```
↓
```
DETERMINE WHETHER THE LOCK IS SET
FOR THE AT LEAST ONE BUSINESS OBJECT NODE
                                         220
```
↓
```
STORE, IN THE QUEUE, THE UPDATES OF THE
AT LEAST ONE BUSINESS OBJECT NODE THAT OCCUR
IN PARALLEL WITH THE REPLICATING PROCESS IN
AN INSTANCE IT IS DETERMINED THE LOCK IS SET
FOR THE AT LEAST ONE BUSINESS OBJECT NODE
                                         225
```

*FIG. 2*

FAST SEARCH REPLICATION SYNCHRONIZATION PROCESSES

FIELD

Some embodiments herein relate to business object modeled databases. In particular, some embodiments concern a mechanism to maintain data consistency relating to a replication process and changes occurring in parallel with the replication process.

BACKGROUND

Monitoring, tracking, and maintaining data consistency of database data structures is of vital importance to software programs, operating systems, and computer platforms, including database systems and enterprise level operating architectures. As systems, applications, and platforms increase in complexity, the amount of data processed by the systems increases in breadth and complexity, and business operations become more reliant on such systems to sustain and grow, the importance of maintaining data consistency across multiple persistencies of a given data structure also increases. Additionally, the efficiency of the methods and mechanisms used to monitor, track, and maintain data consistency of data becomes a greater concern as the systems increase in size and complexity.

In some instances, a large amount of data may need to be replicated for use by a system, service, application, or computing task. In a first instance, all of the data that may potentially be accessed, modified, or otherwise processed by the system, service, application, or computing task may be replicated to a second persistence from a first persistence so that the particular system, service, application, or computing task may have access to the data. Thereafter, it may be sufficient to provide the particular system, service, application, or computing task with changes or updates of the data (e.g., modifications, insertions, and deletions). While the "initial loading" of the data for use by a system, service, application, or computing task may itself be a tremendous undertaking given the complexity and amount of data that is to be replicated, the task of the initial load may be further complicated by the dynamic changing of the data during the initial load process. While the initial load is in process, any number of systems, services, applications, computing tasks, and users may update or otherwise change a persistence of the data. There then remains a need to synchronize the data of the initial load with the updates that occurred during the initial load.

Accordingly, an efficient mechanism for achieving data consistency after an initial load of data, including changes and updates of the data that occur in parallel with the initial load is addressed by some embodiments herein.

DESCRIPTION OF DRAWINGS

FIG. 2 a flow diagram illustrating various aspects of the present disclosure;

DETAILED DESCRIPTION

Figure 1:
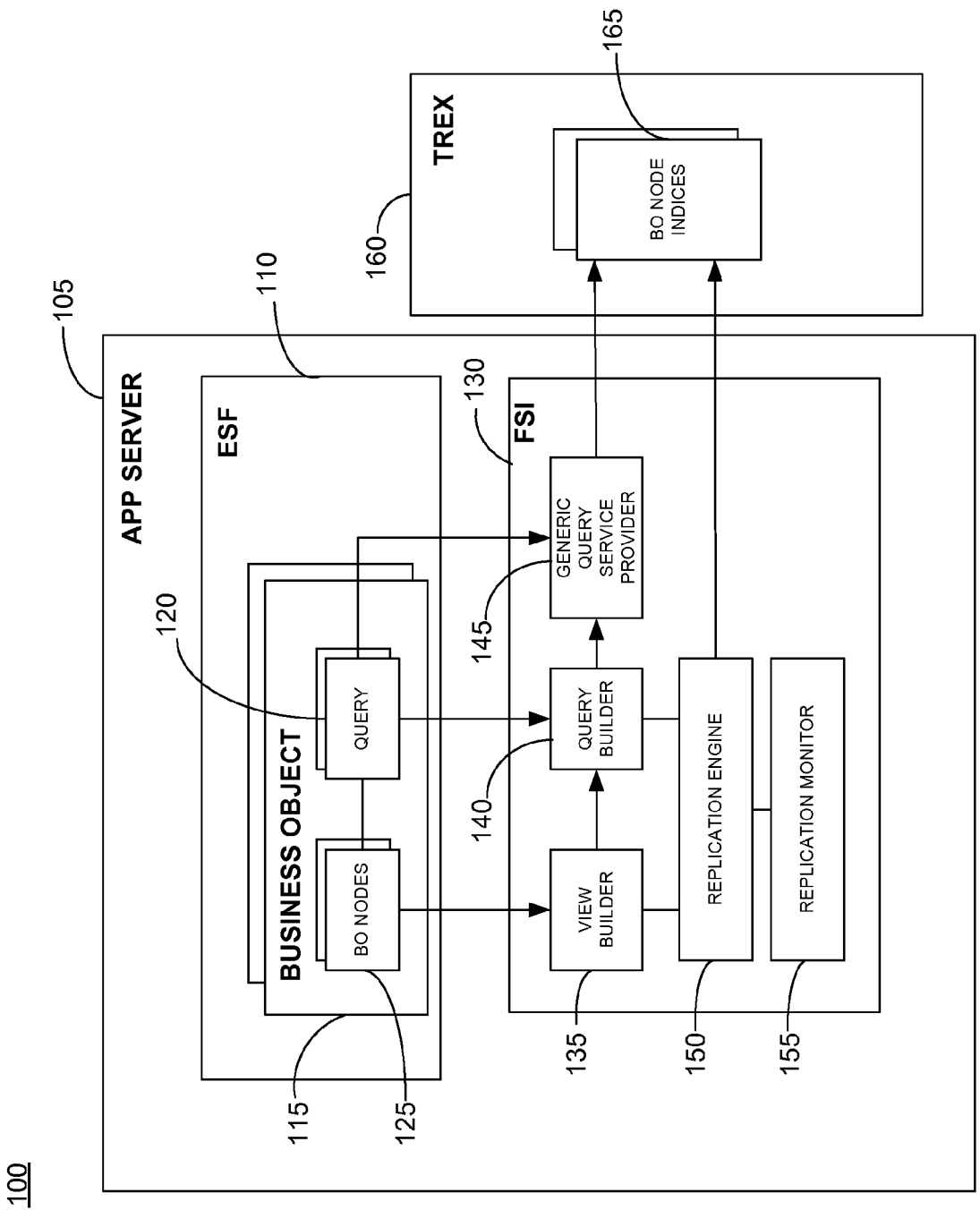
FIG. 1 is an exemplary block diagram of an operating environment suitable for supporting various aspects of the present disclosure.

FIG. 1 is a block diagram of an enterprise computing environment 100 suitable for implementing and providing services related to a business object modeled database. System 100 includes an applications server 105 comprising an enterprise service framework (ESF) 110 and a Fast Search Infrastructure (FSI) 130. Application server 105 may interface with a search engine 160 such as, for example, the TREX search engine depicted in FIG. 1 and provided by SAP AG. Business objects (BO) such as business object 115, in accordance with the business object concept incorporated herein, their nodes 125 and all of their services (e.g., query services 120) are modeled and may include any suitable data structure. The BO are defined within ESF 110, wherein the definition for each BO includes BO nodes 115 and query services 120 for search processing belonging to the BO nodes. Business object nodes are the transitional entities of the BO model herein and form the basis of queries that use FSI 130 as an implementation tool for query services.

The view builder 135 of FSI 130 provides a mechanism to construct views over BO nodes. The fast search (FS) views contain data-modeling definitions and view-field definitions; are used to encapsulate data modeling details such as, for example join relations between multiple BO nodes; hide data sources by exposing view fields to external users; and represent a logical collection of the of the data. Metadata of a FS view describes the BO nodes (i.e., data) that is to be replicated to additional persistencies. The additional persistencies may include database structures such as tables and search engines (e.g., TREX 160). Query builder 140 provides a mechanism to map queries onto view fields, as defined by query service(s) 120. Query service provider 145 implements and executes the query.

According to some embodiments, system 100 supports a method and mechanism for persisting a business object (BO) to more than one instance. For example, a BO may be persisted to a data structure such as a database table or a search engine (e.g., TREX search engine 160). An additional persistence of the BO may be used by a service or application in order to, for example, efficiently access and perform operations using the BO. An initial load of BO nodes may be requested so that a service, for example, query service 145 may execute a query against the BO nodes. In some embodiments, each BO includes a query that defines a query, for example named SELECT_ALL, for the root BO node that delivers all keys of the node. The SELECT_ALL query is used to provide an initial persistence to the BO. The SELECT_ALL query exists only once within a BO and is attached to the root node. The SELECT_ALL query returns all node IDs of the root node. In turn, FSI 130 uses these IDs to replicate the root node's data.

In some aspects, embodiments herein provide a mechanism to maintain data consistency between a first persistence of a BO and a second persistence of the BO, including scenarios where updates to the BO occur in parallel to the initial load of the BO to the second persistence. Accordingly, some embodiments provide an update replication mechanism and synchronization between an initial load and updates to ensure updates occurring in parallel with the initial load are accurately accounted for and reflected in the second persistence of the BO.

In general, the replication process may be divided into three parts, a pre-processing phase, a replication tree walk, and a post-processing phase. The pre-processing phase and post-processing phase of the replication process may be implemented, in accordance with the present disclosure, to provide a mechanism to maintain data consistency between a first persistence of a BO and a second persistence of the BO, including instances including updates to the BO that occur in parallel to the initial load of the BO to the second persistence.

FIG. 2 illustrates a flow diagram of a process 200 in accordance with some BO synchronization processes herein. At operation 205, a request to perform an initial load of a first persistence of at least one BO to replicate the BO to a second persistence is received. In some embodiments, the request may be invoked automatically in response to a service or task by system 100. In other embodiments, the request may be invoked manually. For some embodiments, in accordance with an SEARCH_ALL or similarly functioning query, a request is made that includes performing an initial load of all nodes corresponding to the BO that is to be replicated as identified by the query.

At operation 210, a queue is provided to store updates of the at least one BO node associated with the BO that is to be replicated to the second persistence. In particular, the queue (i.e., a replication queue) is provided to accommodate BO nodes that are updated in parallel (i.e., coincident in time) with the initial load that will be performed in response to the request and in accordance with the SEARCH_ALL query. In some embodiments, NodeIDs of the BO nodes to be replicated to the second persistence are stored or written to the queue instead of the subject BO node data.

At operation 215, a lock is set or acquired for the at least one BO node. This lock provides an indication to other tasks, services, and applications that a replicating process involving the BO node is being performed and that all updates occurring in parallel with the replicating process for the BO node will be queued.

In some embodiments, a status indication of the initial load process is provided so that, for example, users and other tasks, services, and applications may be informed of the current status of the BO while the BO is being replicated during an initial load. A monitor service or the like may be provided or implemented to monitor the status of a BO in some aspects herein. Replication monitor 155 of FIG. 1 may provide this type of monitoring service.

Some embodiments provide or facilitate providing an indication or designator to indicate that a BO (i.e., BO node) is undergoing an initial load. In this manner, a task, service, or application may be notified that a process or service using the BO node may not return accurate results since the BO node is in the process of being replicated and all updates thereto may not be reflected or captured by the persistence of the BO node used by the particular task, service, or application.

Some embodiments include disabling aspects of a service, task, or application that may not be needed or may not enhance the performance and/or efficiency of the initial load. For example, a service, task, or functionality associated with a search engine (e.g., search engine TREX 160) that monitors and tracks changes to data structures associated with the search engine may not be needed during an initial load of business objects for the particular service, task, or application since the business objects are being loaded (i.e., persisted) a first time for the service, task, or application.

At operation 220, a determination is made whether the lock (or lock mechanism) is set or acquired for the BO node(s) associated with the initial load. In the instance the lock indicating the BO node is being replicated in an initial load is set, then updates to the BO node are stored in the replication queue as shown at operation 225. It is noted that instead of the data of the corresponding BO node being stored in the queue, some embodiments store an indicator (e.g., a NodeID corresponding the BO node) in the queue.

Accordingly, process 200 provides a mechanism involving a lock mechanism(s) and a replication queue to account for updates that may occur in parallel with an initial load of a BO.

Figure 3:
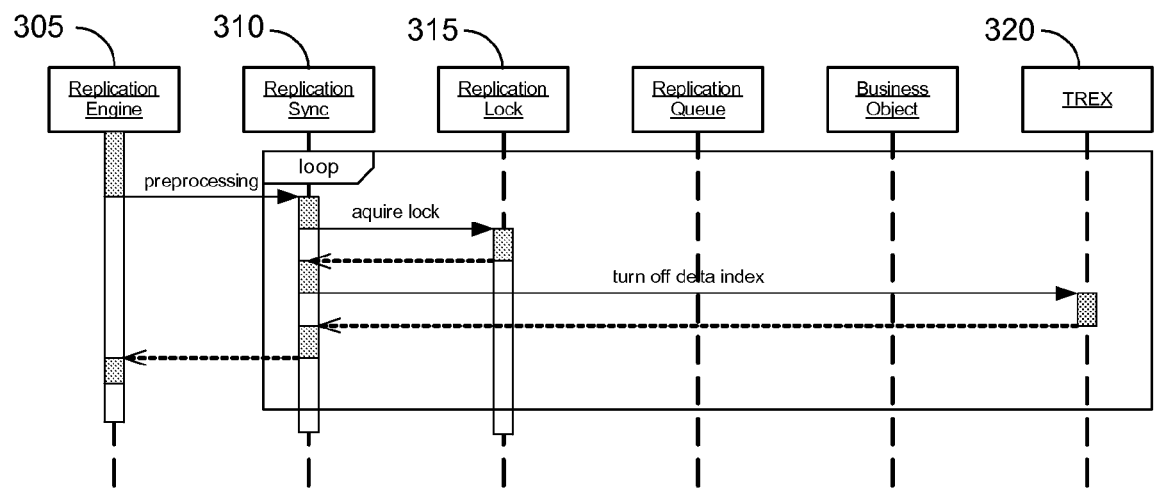
FIG. 3 is a diagram illustrating a sequence of operations, in accordance with some embodiments herein.

FIG. 3 is illustrates a sequence of events, a process 300, in accordance with some aspects herein. In particular, process 300 includes a pre-processing phase of an initial load. The pre-processing phase includes a replication engine 305 communicating with a replication synchronization service, task, or application 310. Replication synchronization service 310 acquires a lock for the BO nodes corresponding to the initial load of BOs from replication lock service, task, or application 315. In some embodiments, the lock is a write lock. Since a plurality of BO nodes may be associated with the one or more BOs of the initial load, the acquisition of locks may be repeated as necessary to get a lock for each of the corresponding BO nodes. Once the lock is successfully set, all updates to the corresponding BO nodes are queued in the replication queue.

In some embodiments, a change tracking task, service, application, or functionality associated with a service or application associated with the second persistence may be disabled since the change tracking functionality may not be needed during the initial load. In this manner, efficiencies may be gained by not allocating resources or executing the change tracking task in the instance such functionality is not needed or desired. In FIG. 3, a delta index function that tracks changes to data associated with the TREX search engine 320 is turned off by the replication synchronization service, task, or application 310.

Figure 4:
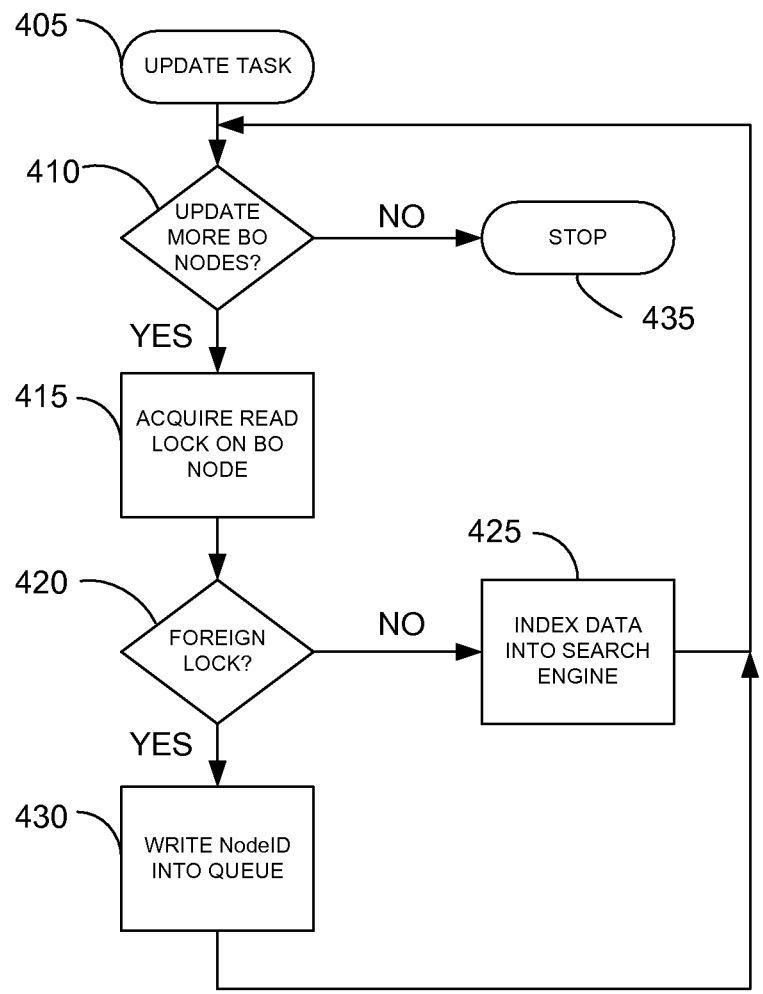
FIG. 4 a flow diagram illustrating various aspects of the present disclosure.

FIG. 4 provides a flow diagram 400 of an "update task" for the processing of updates to BO nodes corresponding to the initial load of one or more BOs. The update task starts at 405 and proceeds to operation 410 where a determination is made whether more BO nodes are to be updated. If no more BO nodes are to be updated, then process 400 terminates at operation 435. If more BO nodes are to be updated, then process 400 proceeds to operation 415 where acquisition of a read lock for the corresponding BO node is initiated. If the acquisition of the read lock succeeds, process 400 proceeds to operation 425 wherein the data or an index of the corresponding BO node is stored in the search engine (or other specified location) at operation 425. If the acquisition of the read lock fails, process 400 proceeds to operation 430 wherein the data or an index of the corresponding BO node is stored in the replication queue. The determination of whether the read lock succeeds or fails is made at operation 420. The read lock succeeds if there is no other lock (i.e., a foreign lock), namely a write lock as discussed with reference to FIG. 3. Conversely, the read lock fails if there is another lock. In particular, the presence of a write lock (i.e., a foreign lock) indicating an initial load is being performed with regards to the corresponding BO node as discussed above results in the read lock failing due to a lock collision. Accordingly, the data or an index of the corresponding BO node is stored in the replication queue at operation 430.

Figure 5:
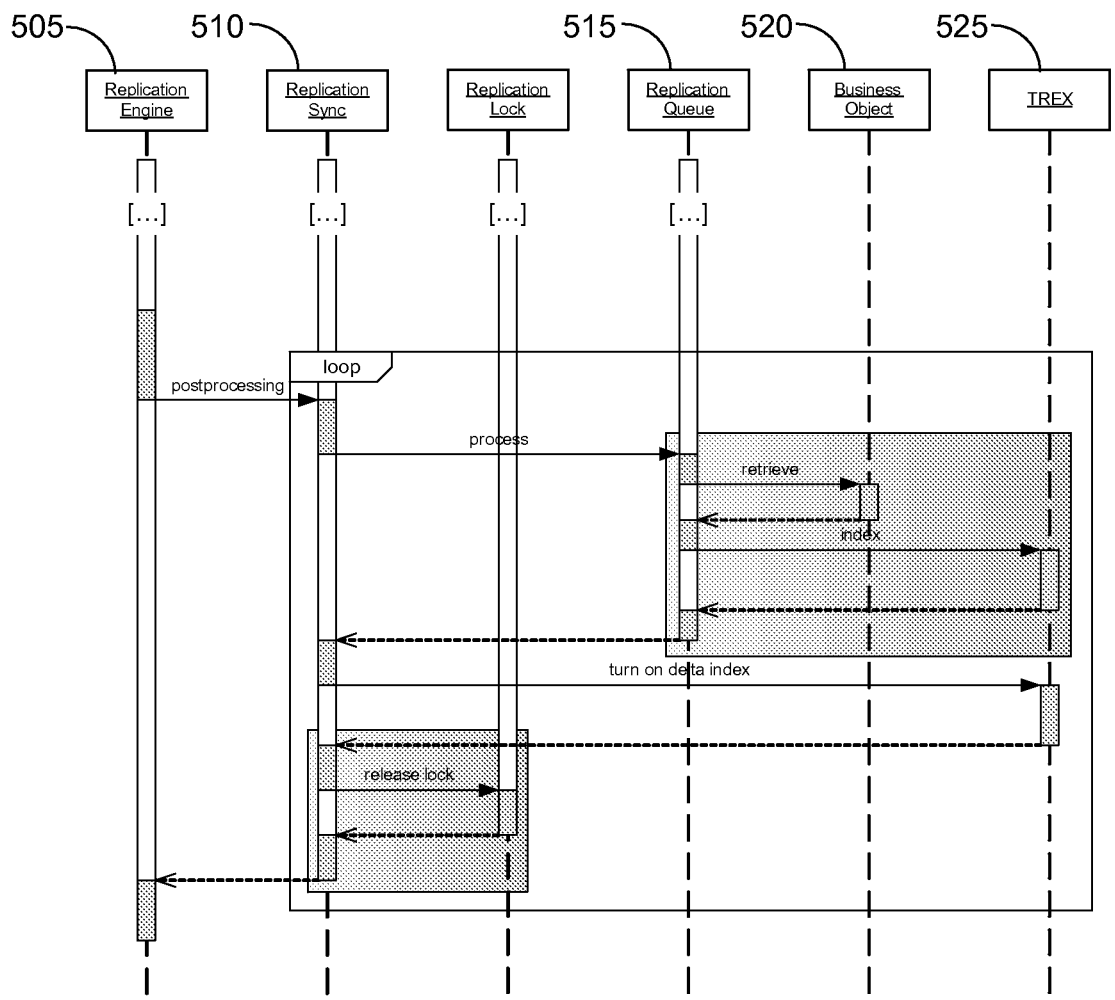
FIG. 5 is a diagram illustrating a sequence of operations, in accordance with some embodiments herein.

FIG. 5 illustrates a sequence of events, a process 500, in accordance with some aspects herein. In particular, process 500 illustrates aspects of embodiments herein that may occur after an initial load has occurred. That is, a post-processing phase of the initial load. The post-processing phase includes a replication engine 505 communicating with a replication synchronization service, task, or application 510. Synchronization service 510 communicates with a replication queue 515 to process the replication queue. Replication queue 515 retrieves the BO 520 corresponding to the nodeID in the queue. Additionally, the BO node may be indexed to the TREX search engine 525 to provide the search engine with the BO updates.

In some embodiments, a change tracking task, service, application, or functionality associated with a service or application associated with the second persistence may be enabled since the initial load has completed. In this example, the delta index of TREX search engine 525 is turned on, as indicated by the communication between the synchronization service 510 and the TREX search engine 525.

Figure 6:
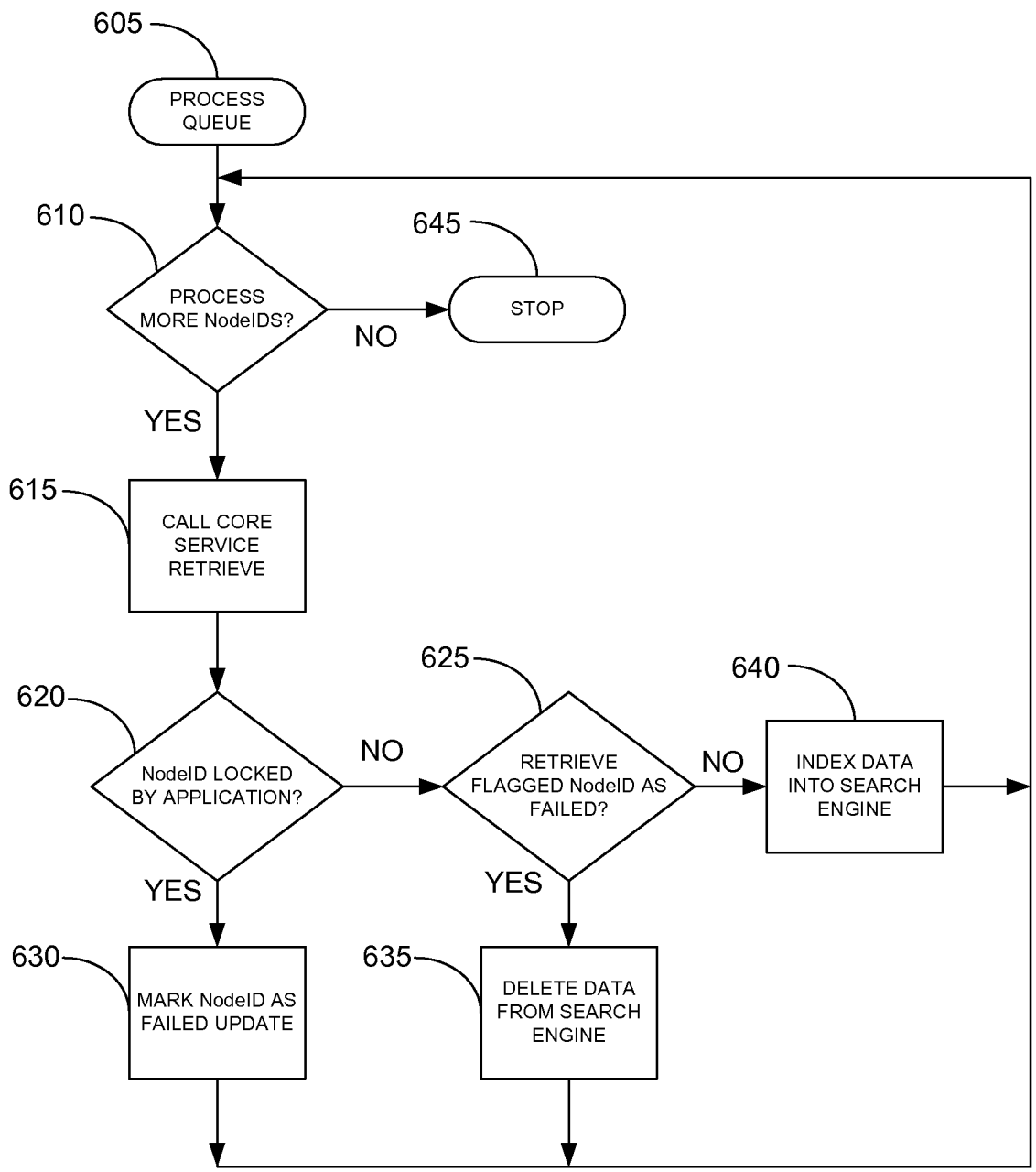
FIG. 6 is a flow diagram illustrating various aspects of the present disclosure is a diagram illustrating another sequence of operations, in accordance with some embodiments herein.

FIG. 6 provides a flow diagram of a process 600 illustrative of processing the replication queue. In some embodiments, the corresponding BO nodes of the one or more BOs being replicated are indexed to the search engine (e.g., TREX search engine 160). Processing of the replication queue starts at operation 605 and involves reading the corresponding BO nodes from the queue and inserting them in the appropriate database data structure and/or search engine. If no more BO node IDs are to be processed as determined at operation 610, then process 600 terminates at 645. Otherwise, process 600 proceeds to operation 615. To indicate that a node is being processed a timestamp associated with the BO node may be updated in the queue. Knowing BO node IDs from the replication queue, a corresponding retrieve core service of the corresponding BO is initiated at operation 615. However, it is desired to guarantee that no parallel transaction is executing a save during the time the retrieve core service is executing. Therefore, the retrieve core service may request an exclusive lock.

If there is no lock collision by the retrieve core service, then data may be safely written into a database data structure and/or indexed into the search engine (e.g., TREX search engine) at operation 640. Node IDs that are returned as "failed" node IDs at operation 625 are deleted at operation 635. Alternatively, if there is a lock collision at operation 620 as indicated by an appropriate message on return of the retrieve service then the secondary persistencies are neither updated nor are the node IDs deleted from the secondary persistencies (e.g., a database data structure or search engine) at operation 630. Such node IDs may be marked as locked in the queue by an error text. Further, the node IDs are flagged as if they are failed updates. In this manner, a process taking care of failed updates may update the FSI persistencies in the future.

Figure 7:
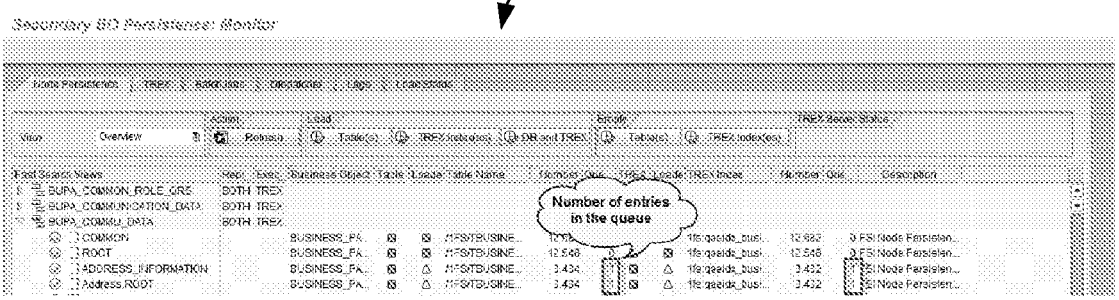
FIG. 7 is an example screen snapshot, in accordance with some embodiments herein.

FIG. 7 illustrates an exemplary screen snapshot, in accordance with some embodiments herein. As shown, screen 700 includes a secondary persistence monitor 705 that provides a graphical, visual indication of BO nodes and other data structure and attributes associated with a BO that is being replicated. In some embodiments, including that of screen shot 700, details regarding a BO node persistence, associated data tables, and indexes may be provided by the secondary persistence monitor 705.

In some embodiments, a user may choose or specify a View, such as a FS View. The secondary persistence monitor 705 may provide a graphical representation of the BO node, replication status, name of a corresponding shadow table, number of available records, date and time of a replication, status of a search engine (e.g., TREX search engine 160).

The embodiments herein may be implemented in computer hardware, firmware, software, or in combinations of them. Some embodiments may be implemented as a computer program product, i.e., a computer program tangibly embodied in a hardware medium, e.g., in a machine-readable storage device having program code or instructions stored thereof, for execution by, or to control the operation of, a data processor (e.g., a programmable processor, a computer, or network of computers). In some embodiments, a computer program in accordance with the present disclosure may be implemented independent of a particular programming language and/or processing system and/or computer operation or application platform.

Suitable processors for the execution of a program of instructions include, by way of example, both general and special purpose microprocessors, and the sole processor or one of multiple processors of any kind of computer. Storage devices and mediums suitable for tangibly embodying computer program instructions and data may include, for example, all forms of non-volatile memory, magnetic disks, magneto-optical disks, CD-ROM and DVD-ROM disks. In related embodiments, computer program may operate independent of any particular form of programming language, computing system, industry, application, communication protocol, and operating system.

A number of embodiments of the invention have been described herein. However, it will be understood that various modifications may be made without departing from the spirit and scope of the invention. Accordingly, other implementations are within the scope of the following claims.

What is claimed is:

1. A computer implemented method, the method comprising:
    receiving a request to perform an initial load of a first persistence of a set of business objects to replicate the set of business objects to a second persistence of the business objects;
    providing a queue to store updates of at least one business object node associated with the set of business objects;
    acquiring a write lock for at least one business object node in the set of business objects, the write lock indicating the at least one business object is subject to a replicating process that is performing the initial load of the at least one business object node;
    determining whether the write lock is set for the at least one business object node;
    acquiring a read lock for the at least one business object node;
    determining whether there is a conflict between the write lock and the read lock for the at least one business object node; and
    storing, in the queue, updates of the at least one business object node that occur in parallel with the replicating process in an instance it is determined the write lock is set for the at least one business object node, thereby indicating a replicating process is performing the initial load of the at least one business object node, and there is a conflict between the write lock and the read lock.

2. The computer implemented method of claim 1, wherein the business object includes a predefined data structure associated with a business object modeled database.

3. The computer implemented method of claim 1, wherein the updates for the at least one business object node are stored in the second persistence of the business object in the instance there is not a conflict between the write lock and the read lock.

4. The computer implemented method of claim 1, wherein the updates comprise an identifier of the at least one business object node associated with the updates.

5. The computer implemented method of claim 1, further comprising determining all of the business objects in the first persistence to be replicated in the initial load.

6. The computer implemented method of claim 1, wherein the second persistence comprises a database storage structure and a search engine.

7. The computer implemented method of claim 1, further comprising:
reading the updates from the queue; and
inserting the updates to the second persistence.

8. The computer implemented method of claim 7, further comprising releasing the locks on the at least one business object node.

9. The computer implemented method of claim 1, further comprising:
providing an indication of a status of the initial load; and
providing an indication that the initial load is completed.

10. A medium storing processor-executable program instructions thereon, the medium comprising:
instructions to receive a request to perform an initial load of a first persistence of a set of business objects to replicate the set of business objects to a second persistence of the business objects;
instructions to provide a queue to store updates of at least one business object node associated with the set of business objects;
instructions to acquire a write lock for the at least one business object node in the set of business objects, the write lock indicating the at least one business object is subject to a replicating process that is performing the initial load of the at least one business object node;
instructions to determine whether the lock is set for the at least one business object node
instructions to acquire a read lock for the at least one business object node; and
instructions to determine whether there is a conflict between the write lock and the read lock for the at least one business object node;
instructions to store, in the queue, the updates of the at least one business object node that occur in parallel with the replicating process in an instance it is determined that the write lock is set for the at least one business object node, thereby indicating the replicating process is performing the initial load of the at least one business object node, and there is a conflict between the write lock and read lock.

11. The medium of claim 10, wherein the business object includes a predefined data structure associated with a business object modeled database.

12. The medium of claim 10, wherein the updates for the at least one business object node are stored in the second persistence of the business object in the instance there is not a conflict between the write lock and the read lock.

13. The medium of claim 10, wherein the updates comprise an identifier of the at least one business object node associated with the updates.

14. The medium of claim 10, further comprising determining all of the business objects in the first persistence are to be replicated in the initial load.

15. The medium of claim 10, wherein the second persistence comprises a database storage structure and a search engine.

16. The medium of claim 10, further comprising:
instructions to read the updates from the queue; and
instructions to insert the updates to the second persistence.

17. The medium of claim 16, further comprising instructions to release the locks on the at least one business object node.

18. The medium of claim 10, further comprising:
instructions to provide an indication of a status of the initial load; and
instructions to provide an indication that the initial load is completed.

* * * * *